(12) United States Patent
Vijayaraghavan et al.

(10) Patent No.: US 12,020,352 B2
(45) Date of Patent: Jun. 25, 2024

(54) PROJECT VISUALIZATION SYSTEM

(71) Applicant: Accenture Global Solutions Limited, Dublin (IE)

(72) Inventors: Koushik M. Vijayaraghavan, Chennai (IN); Srikanth Prasad, Bangalore (IN); Mark Lazarus, Caulfield (AU); Vaishali Pandit, Navi Mumbai (IN); Aditi Kulkarni, Bangalore (IN); Krupa Srivastava, Chennai (IN); Pareshkumar Ramchandbhai Gelot, Deesa (IN); Akshay Bakhru, Bangalore (IN); Vyshak Kannan Iyengar, Bangalore (IN); Roopalaxmi Manjunath, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 172 days.

(21) Appl. No.: 17/646,948

(22) Filed: Jan. 4, 2022

(65) Prior Publication Data
US 2023/0215061 A1  Jul. 6, 2023

(51) Int. Cl.
*G06T 11/20* (2006.01)
*G06Q 10/10* (2023.01)

(52) U.S. Cl.
CPC .......... *G06T 11/206* (2013.01); *G06Q 10/103* (2013.01)

(58) Field of Classification Search
CPC .................. G06T 11/206; G06G 10/103
See application file for complete search history.

(56) References Cited

U.S. PATENT DOCUMENTS

| | | | |
|---|---|---|---|
| 10,042,636 B1 | 8/2018 | Srivastava et al. | |
| 2005/0125276 A1* | 6/2005 | Rusu | G06Q 30/02 705/1.1 |
| 2014/0279838 A1* | 9/2014 | Tsirogiannis | G06F 16/22 707/603 |
| 2020/0202280 A1 | 6/2020 | Yip et al. | |
| 2020/0233662 A1 | 7/2020 | Bissonette et al. | |

(Continued)

OTHER PUBLICATIONS

Joshi, Vaidehi, "Deep Dive Through A Graph: DFS Traversal", Sep. 25, 2017, https://medium.com/basecs/deep-dive-through-a-graph-dfs-traversal-8177df5d0f13 (Year: 2017).*

*Primary Examiner* — Michelle L Sams
(74) *Attorney, Agent, or Firm* — Harrity & Harrity, LLP

(57) ABSTRACT

In some implementations, a device may receive project management data including information related to project elements associated with one or more projects and associations among the project elements associated with the one or more projects. The device may generate one or more data structures representing the project elements associated with the one or more projects and the associations among the project elements associated with the one or more projects. The device may receive a request to visualize project data, wherein the request may indicate a view to use in order to visualize the project data and/or specify criteria related to the project data to be visualized in the view. The device may search the one or more data structures to obtain the project data to be visualized based on the criteria specified in the request. The device may render the project data using the view indicated in the request.

20 Claims, 10 Drawing Sheets

(56) References Cited

U.S. PATENT DOCUMENTS

| | | | |
|---|---|---|---|
| 2020/0234154 A1* | 7/2020 | Ares | G06F 16/217 |
| 2021/0089860 A1* | 3/2021 | Heere | G06N 20/00 |
| 2021/0125124 A1 | 4/2021 | Meharwade et al. | |
| 2021/0149886 A1* | 5/2021 | Zheng | G06N 5/02 |
| 2021/0342785 A1 | 11/2021 | Mann et al. | |
| 2023/0101773 A1* | 3/2023 | Katahanas | G06F 8/38 |
| | | | 715/753 |

\* cited by examiner

PROJECT VISUALIZATION SYSTEM

BACKGROUND

Project management generally refers to techniques to apply processes, methods, skills, knowledge, and experience to lead one or more teams to achieve specific project objectives or goals within given constraints. For example, the main constraints in project management typically relate to scope, time, and budget, and additional challenges may include optimizing how inputs are allocated and applied to satisfy predefined objectives. Project management may differ from routine operations in that project management has final deliverables (e.g., a new product launch, an update to a version or feature of an existing product, offering a new service, and/or developing internal work product, among other examples) that are constrained to a finite timescale and budget. Accordingly, because a project is a complex endeavor designed to produce a unique product, service, or result with a defined scope (usually time-constrained, and often constrained by funding or staffing), project management requires significant planning and coordination, including estimations about project complexity, a quantity and type of resources needed to carry out the project, and/or current and forecasted availability of resources to complete the project. To make these estimations accurately and effectively, project professionals who are tasked with planning the project and coordinating resources to carry out the project typically rely upon various project management tools to plan or organize tasks, track progress, and manage time to deliver a successful project.

SUMMARY

Some implementations described herein relate to a method. The method may include receiving, by a device, project management data that includes information related to project elements associated with one or more projects and information related to associations among the project elements associated with the one or more projects. The method may include generating, by the device and based on the project management data, one or more data structures that represent the project elements associated with the one or more projects and the associations among the project elements associated with the one or more projects. The method may include receiving, by the device, a request to visualize project data, where the request indicates a view to use to visualize the project data and specifies criteria related to the project data to be visualized in the view. The method may include searching, by the device, the one or more data structures to obtain the project data to be visualized based on the criteria specified in the request. The method may include rendering, by the device, the project data using the view indicated in the request.

Some implementations described herein relate to a device. The device may include one or more memories and one or more processors coupled to the one or more memories. The device may be configured to receive project management data that includes information related to project elements associated with one or more projects and information related to associations among the project elements associated with the one or more projects. The device may be configured to generate, based on the project management data, one or more data structures that represent the project elements associated with the one or more projects and the associations among the project elements associated with the one or more projects. The device may be configured to receive, from a client device, a natural language description related to a problem statement associated with project data to be visualized. The device may be configured to identify, using an artificial intelligence model, one or more recommended views to visualize the project data based on an intent associated with the problem statement and one or more project elements or associations relevant to the intent. The device may be configured to provide, to the client device, information indicating the one or more recommended views. The device may be configured to initiate one or more workflows to render the project data using a view that is selected from the one or more recommended views.

Some implementations described herein relate to a non-transitory computer-readable medium that stores a set of instructions. The set of instructions, when executed by one or more processors of a device, may cause the device to receive project management data that includes information related to project elements associated with one or more projects and information related to associations among the project elements associated with the one or more projects. The set of instructions, when executed by one or more processors of the device, may cause the device to generate, based on the project management data, one or more data structures that represent the project elements associated with the one or more projects and the associations among the project elements associated with the one or more projects. The set of instructions, when executed by one or more processors of the device, may cause the device to receive a request to visualize project data. The set of instructions, when executed by one or more processors of the device, may cause the device to search the one or more data structures to obtain the project data to be visualized based on the criteria specified in the request. The set of instructions, when executed by one or more processors of the device, may cause the device to render the project data using the view indicated in the request.

DETAILED DESCRIPTION

Figure 1A:
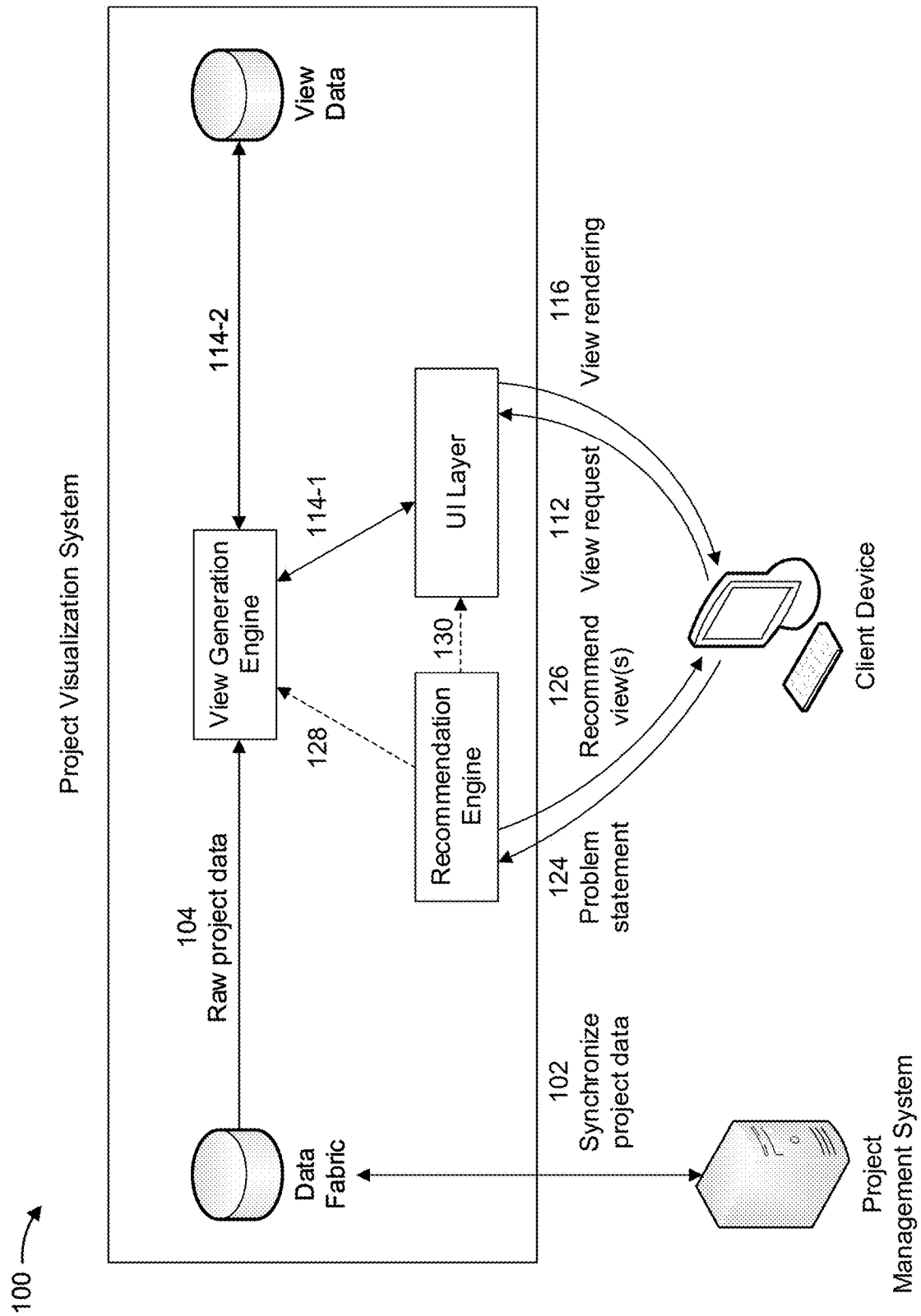
FIGS. 1A-1G are diagrams of an example implementation described herein.

The following detailed description of example implementations refers to the accompanying drawings. The same reference numbers in different drawings may identify the same or similar elements.

Project management is typically a complex task with many facets, which requires distinct technical skills and management strategies. For example, as described above, project management requires significant planning and coordination, including estimations about project complexity, resources needed to carry out the project, and/or current and forecasted availability of resources to complete the project, among other examples. Another challenging issue that often arises in project management relates to project dependencies, which are pervasive in technical and non-technical industries. In a project management context, a dependency is a logical, constraint-based, or preferential relationship between two project elements (which may be referred to herein interchangeably as work items, tasks, and/or activities, among other examples) such that starting and/or finishing a first project element is dependent on a second project element starting and/or finishing. For example, a given project will typically involve various project elements that need to be started, completed, or otherwise performed in a particular order (possibly including some project elements that can be performed in parallel), whereby setting out the dependencies in a project is usually crucial to the project succeeding. For example, effectively managing dependencies within a project generally helps both the project manager(s) and project team(s) work and manage tasks in the best possible order, which helps to ensure that a project will be completed on time (or early), within budget (or under budget), and/or in a manner that satisfies objectives.

Accordingly, in order to manage increasingly complex large-scale projects that may include hundreds or thousands (or more) of project elements and associations (e.g., interconnections, links, and/or dependencies) among project elements, project professionals are typically reliant upon project management tools and applications to help plan, manage, and optimize resources to satisfy project objectives. For example, to facilitate project management processes, many project management applications incorporate visualization tools (e.g., flowcharts, timelines, and/or visual planning boards, among other examples) to help project managers and project team members to complete a project on-time, on-budget, and with the expected quality. For example, existing project management visualization tools include a Kanban board that visually depicts project elements at various stages using cards that move between columns that represent different stages, a Scrum board that includes data organized in columns and rows to plan work in sprints (e.g., repeatable time-boxes in which a project team creates deliverable work in increments), and a Gantt chart that visually depicts a project schedule using a bar chart that also illustrates dependencies between activities.

However, existing tools to visualize project management data suffer from various drawbacks. For example, existing tools to visualize project management data are typically specific to a particular delivery type (e.g., a Scrum board is only used for software development or other projects that are carried out based on the iterative and incremental agile methodology). Accordingly, visualization tools that are developed to support specific delivery types are generally unavailable or unsuitable for other projects that may use a different delivery type to provide similar functionality (e.g., the Scrum board may be unsuitable for a project that is implemented using sequential and linear waterfall methodology). Furthermore, existing project management visualization tools typically lack support for hybrid delivery methodologies (e.g., the Scrumban methodology that combines Scrum and Kanban) are limited to visualizing data that depends on a project phase, lack capabilities to track dependencies across project phases, fail to clearly visualize the various dependencies and impacts in a project, and/or fail to capture multi-level dependencies, among other examples.

Some implementations described herein relate to a project visualization system that may be used to graphically depict project data (e.g., project elements and links, dependencies, relationships, or other associations among project elements) in a way that may enable project managers to understand complex multi-level dependencies between various project elements. For example, in some implementations, the project visualization system may include a data fabric that stores and/or synchronizes project data that may be distributed across one or more project management systems, and the project visualization system may support various workflows to generate graphical views that depict project data in a way that may allow project professionals to view, discover, and derive insights into planned, ongoing, or completed projects. For example, in some implementations, the project visualization system may support a backend processing workflow to pull project management data from the data fabric and generate data structures that represent different project elements and links or other associations among the project elements. In this way, the backend processing workflow may ensure that the project visualization system is continuously updated with real-time or near real-time project management data from the data fabric. Furthermore, as described herein, the project management visualization system may support a frontend processing workflow to retrieve project data to be visualized from the generated data structures and render the project data in a customized view. In this way, the frontend processing workflow may provide detailed and customized project data visualizations to enable data-driven decision-making at every step in a project management lifecycle. Furthermore, in some implementations, the project management visualization system may support a view recommendation workflow in which an artificial intelligence model may recommend one or more suitable views to depict project data based on a natural language description related to a problem statement provided by a user. In this way, the view recommendation workflow may use the artificial intelligence model to continuously learn and recommend the view(s) best suited to visualize project management data that is relevant to an intent of a natural language problem statement.

FIGS. 1A-1G are diagrams of an example implementation 100 associated with visualizing project management data. As shown in FIGS. 1A-1G, example implementation 100 includes a project visualization system, one or more project management systems, and a client device. The project visualization system, the project management system(s), and the client device are described in more detail below in connection with FIG. 2 and FIG. 3.

In some implementations, as shown in FIG. 1A and described in further detail herein, the project visualization system may include an architecture with various components to support a backend processing workflow, a frontend processing workflow, and a view recommendation workflow. For example, as shown in FIG. 1A, the project management system may include a data fabric that is synchronized with the one or more project management systems, a view generation engine that may pull raw project management data from the data fabric and generate view data including data structures to represent project elements and associations extracted from the raw project management data, and a user interface (UI) layer that may obtain and appropriately render project data to be visualized from the data structures stored as the view data. Furthermore, in some implementations, the project visualization system may include a recommendation engine that may receive a natural language problem statement from a client device, use an artificial intelligence model to indicate one or more recommended views based on an intent of the natural language problem statement, and/or interact with the view generation engine and/or the UI layer to initiate the backend and/or frontend processing workflows that may be needed to request and/or render project data associated with a recommended view.

As shown in FIG. 1A, and by reference number 102, the project visualization system may include a data fabric that is synchronized with project management data stored or otherwise managed in one or more project management systems. In some implementations, the project management data may include data related to project elements that are associated with one or more projects. For example, as described herein, the project elements may generally include one or more requirements, user stories, epics, sprints, features, tasks, risks, issues, defects, bugs, test cases, code commits, actions, decisions, change requests, feedback, iterations, milestones, and/or deliverables, among other examples. Furthermore, in some implementations, the project management data may include data related to associations (e.g., links, interconnections, and/or dependencies) among the project elements. In some implementations, the project elements and the associations among the project elements may be specified or derived from project documentation, such as one or more technical documents and/or functional documents that describe various requirements associated with a project. In some implementations, the project documentation may be created and uploaded to the project management system(s) during any suitable phase in a project, such as an initial planning phase and/or during an execution phase. The project documentation may generally include text descriptions that relate to all relevant project details, including objectives, constraints, and/or work items to be performed. The project documentation may therefore include various textual data sources that describe the project plan and ongoing project efforts, which may be referenced to ensure that project requirements are fulfilled and provide traceability with regard to which work items have been performed, who performed the work items, when the work items were performed, which work items are scheduled to be performed in the future, and/or when the future work items are scheduled to be performed, among other examples. For example, the project management system(s) may include one or more devices executing a Jira software product used for issue tracking and agile project management, an application lifecycle management (ALM) tool used for software development lifecycle management, an Azure DevOps Server or Team Foundation Server (TFS) product (e.g., enabling project management for agile, waterfall, and/or iterative software development), and/or any other suitable project management software or project management utility.

Accordingly, in some implementations, the project management data that is stored in the data fabric and synchronized with the project management system(s) may provide the project visualization system with detailed real-time or near real-time information related to the project elements and associations among project elements for planned, ongoing, and/or completed projects. Furthermore, as described herein, synchronizing the data fabric with the project management system(s) may enable backend processing workflow that is used to pull project management data and generate data structures that can be used to easily visualize the project management data and enable robust data analytics to provide insights to project professionals.

In particular, as further shown in FIG. 1A, and by reference number 104, the backend processing workflow may include the view generation engine receiving, from the data fabric, raw project management data (e.g., substantially unprocessed project management data that is synchronized with the project management system(s)). For example, in some implementations, the view generation engine may periodically pull the raw project management data from the data fabric, and may pull only delta project management data in each pull iteration (e.g., in each pull, the view generation engine may only transfer raw project management data that is new or modified since a most recent pull). Furthermore, as described in further detail herein, the view generation engine may pull the delta project management data from the data fabric based on a request from the UI layer and/or the recommendation engine to obtain project management data to support a requested and/or recommended view. In this way, by periodically pulling the delta project management data in each pull iteration and/or upon request, the project visualization system may operate on real-time or near real-time project management data and/or efficiently update project management view data even in cases where there may be many hundreds or thousands (or more) of project elements and associations among project elements.

Figure 1B:
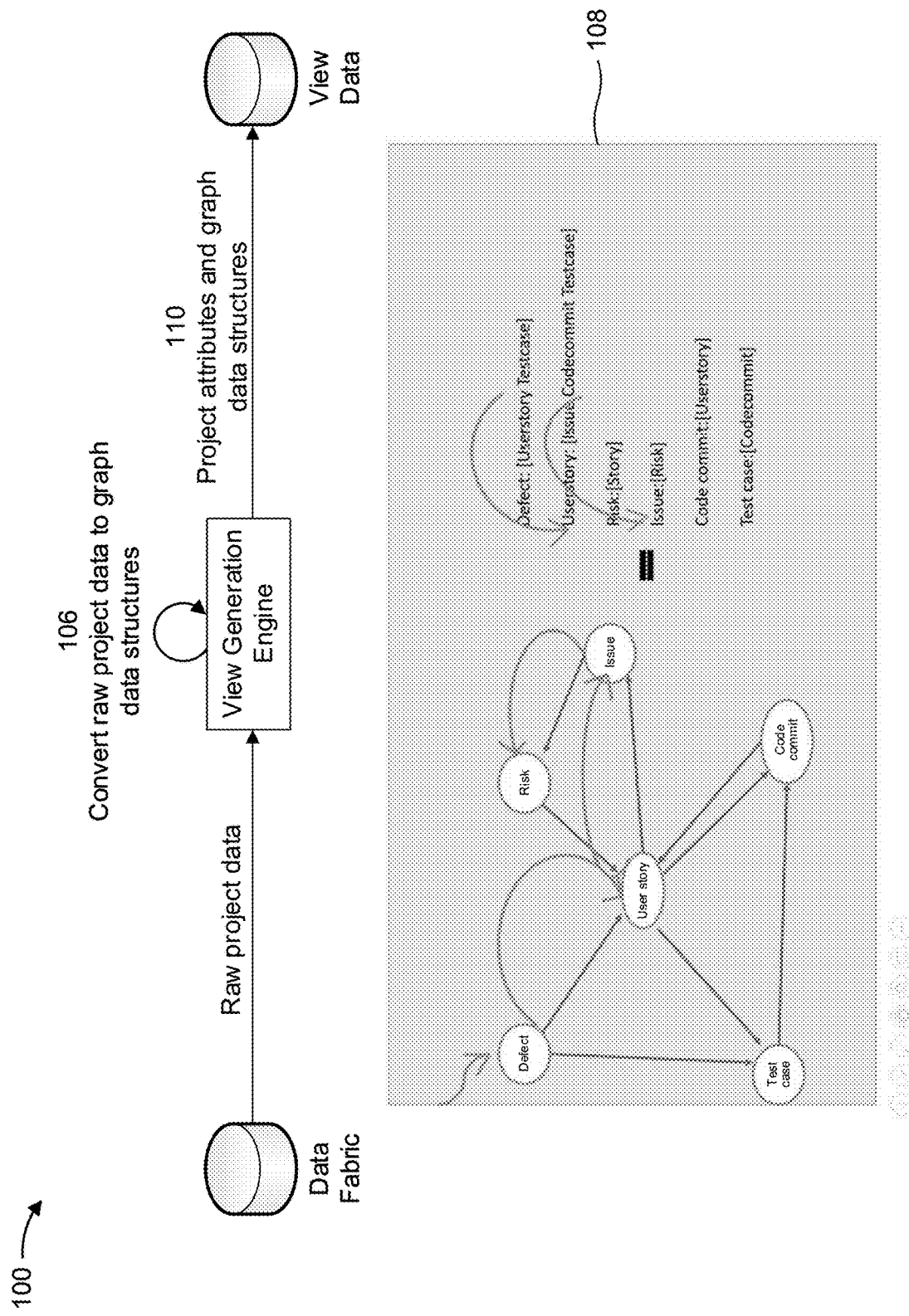

As shown in FIG. 1B, and by reference number 106, the view generation engine may convert the raw project management data obtained from the data fabric into data structures that represent the project elements and the associations among project elements in a view-friendly format. For example, in some implementations, the view generation engine may pre-process the raw project management data to strip or otherwise remove unwanted attributes (e.g., attributes that are not relevant to a project element or an association between project elements), and the view generation engine may then store remaining attributes associated with the raw project management data in the view data. Furthermore, in some implementations, the view generation engine may extract information related to project elements and links, relationships, interconnections, dependencies, and/or other associations among project elements based on the stored attributes. The view generation engine may then generate the data structures to represent the project elements and the associations among project elements based on existing linkages that are defined in the project management data obtained from the data fabric. For example, as described in further detail herein, the view generation engine may generate the data structures to represent the project elements and the associations among project elements using a graph methodology, which may format the project management data in a way that translates to a pictorial and easy-to-understand representation of the project management data.

For example, in some implementations, the view generation engine may identify, based on the project management attributes that are stored with the view data, project elements and existing associations among project elements. Accordingly, the data structures generated by the view generation engine may include various graph data structures, where each project element is represented by a node and each link, dependency, relationship, or other association between two project elements is represented as an edge or connection between two nodes. For example, the view generation engine may generate the graph data structures using an adjacency list implementation in which all nodes in the graph data structures are defined as keys and a value associated with each key is an array that represents one or more connected nodes. For example, in FIG. 1B, reference number 108 illustrates an example graph data structure that represents a user story project element that has associations with various other project elements, including a defect, a test case, a risk, an issue, and a code commit. In the adjacency list approach, the view generation engine may convert each project element to a node and may convert each association between two project elements to an edge or connection between the two corresponding nodes. For example, as shown, the defect project element may be represented as a key, and a value associated with the key may be an array that includes the user story and test case project elements. Accordingly, the defect, user story, and test case project elements are represented as separate nodes, and the defect project element has edges pointing to the user story and test case project elements to represent the associations that are defined for the defect project element. Similarly, the user story project element includes associations with the issue, code commit, and test case project elements, whereby the node representing the user story project element has edges pointing to the nodes that represent the issue, code commit, and test case project elements.

In this way, by processing various key-value pairs to generate the graph data structures that represent the project elements and the associations among the project elements (e.g., using an adjacency list implementation), the view recommendation engine may readily translate the graph data structures to various view formats, as described in further detail below. Furthermore, using the key-value pairs to represent the project elements and the associations among the project elements can be used to quickly determine how many nodes and edges are included in a particular graph data structure. For example, the number of nodes in a graph data structure may correspond to a number of keys in a dictionary associated with the graph structure, and the number of edges may correspond to the sum of the lengths of the arrays associated with all of the keys. Furthermore, graph data structures that are formatted as adjacency lists may be easy to update when there is a need to add or remove one or more nodes due to changes in the project management data synchronized at the data fabric, and graph data structures that are formatted as adjacency lists may be easy to traverse when needed to search for project data to be visualized. Accordingly, as shown in FIG. 1B, and by reference number 110, the backend processing workflow may include storing the attributes associated with the project management data and the data structures that represent the project elements and the project element associations as view data that may be formatted for quick display and rendering via the UI layer (e.g., a Data-Driven Documents (D3) layer that can render dynamic and interactive data visualizations in a browser).

Referring again to FIG. 1A, as shown by reference number 112, the frontend processing workflow may include receiving, at the UI layer, a request to view or otherwise visualize project data. For example, in some implementations, the request may indicate a particular view to be used (e.g., a galaxy view, a problem areas view, an impact analysis view, a composition view, and/or another suitable view) and may indicate one or more criteria associated with the project data to be visualized. For example, a user at the client device may utilize a suitable application or interface to access the project visualization system, and the UI layer may display information that enables the user at the client device to specify various parameters associated with the project data to be visualized and/or the particular view to be used. Accordingly, as shown by reference numbers 114-1 and 114-2, the UI layer may issue the request to the view generation engine, and the view generation engine may pull customized project data to support the requested view from the view data. For example, as described above, the view data may include various graph data structures that represent project elements and associations among project elements, whereby the view generation engine may search the graph data structures for the project data requested by the user at the client device. For example, in some implementations, the view generation engine may use a recursive depth-first search to traverse the graph data structures.

In particular, the recursive depth-first search may support backtracking, whereby nodes in a graph may be exhaustively searched by moving ahead to a child node, if one exists, and otherwise backtracking to a parent node. In other words, if there are no more child nodes when a graph is traversed along a current path, the recursive depth-first search may backtrack by moving backwards along the current path in order to find more nodes with child nodes to traverse. Accordingly, the recursive depth-first search may visit all nodes on the current path until all visited nodes have been traversed, and the recursive depth-first search may subsequently select a next path to traverse. In some implementations, the recursive depth-first search may be enabled using stacks, where a starting node is initially selected and all nodes that are adjacent to the starting node are pushed into a first stack. To select a next node to visit, a node may be popped from the first stack, and all nodes that are adjacent to the popped node may be pushed into a second stack, and this process may be repeated until the first stack is empty. Furthermore, each node that is visited during the recursive depth-first search may be marked to prevent the recursive depth-first search from visiting the same node multiple times and/or avoid infinite loops.

As further shown in FIG. 1A, and by reference number 116, the UI layer may receive the requested project data (e.g., after the view generation engine performs one or more formatting changes, decrypts one or more attributes, and/or performs any other processing that may be needed to pass the requested project data to the UI layer), and the UI layer may render the data at the client device (e.g., in a browser) using one or more visualization libraries (e.g., a D3.js JavaScript library that uses Scalable Vector Graphics, HTML5, and Cascading Style Sheets standards to create dynamic and interactive data visualizations in a web browser). Furthermore, in some implementations, the UI layer may apply additional processing and filtering logic to create custom views of the project management data based on the criteria specified in the request from the client device. Furthermore, the UI layer may render the project data in a way that enables scalability for projects that may have a very large number of project elements and associations. For example, the UI layer may adapt the visualizations that are rendered for the client device to display only a partial subset of the project elements and/or associations that are included in a particular view. In this way, the UI layer may present the partial subset of the project elements and/or associations that are most relevant to the criteria specified in the request from the client device, and the user of the client device may navigate and/or expand the graph data structures that are depicted in the current view based on user inputs (e.g., the UI layer may render additional data to provide more context around a project element or association with which a user interacts). In this way, the project visualization system can scale the visualization data to hundreds or thousands (or more) of project elements (e.g., by upgrading a supporting infrastructure, such as storage and processing resources allocated to the project visualization system in a cloud computing, to an appropriate tier).

In some implementations, as described herein, the view rendered by the UI layer may generally utilize the graph data structures that are generated from the project management data (e.g., after any pre-processing performed by the view generation engine), which may enable the project elements and associations among project elements to be plotted, depicted, or otherwise visualized in various ways (e.g., based on an intensity of connections between project elements, based on a proximity to a similar type of project element, and/or on a timeline, among other examples). For example, the graph data structures that are used to represent the project elements and associations among project elements may enable the project visualization system to create and render views that depict project elements as nodes in an interactive graph with associations represented as links to enable users to analyze dependencies or other associations among project elements. For example, in a context related to a software development project, the view rendered at the client device can depict one or more releases, features and user stories that are associated with the one or more releases, test cases and defects associated with the user stories, risks associated with any of the foregoing project elements, and/or any other suitable types of project elements that may be connected or otherwise associated.

Figure 1C:
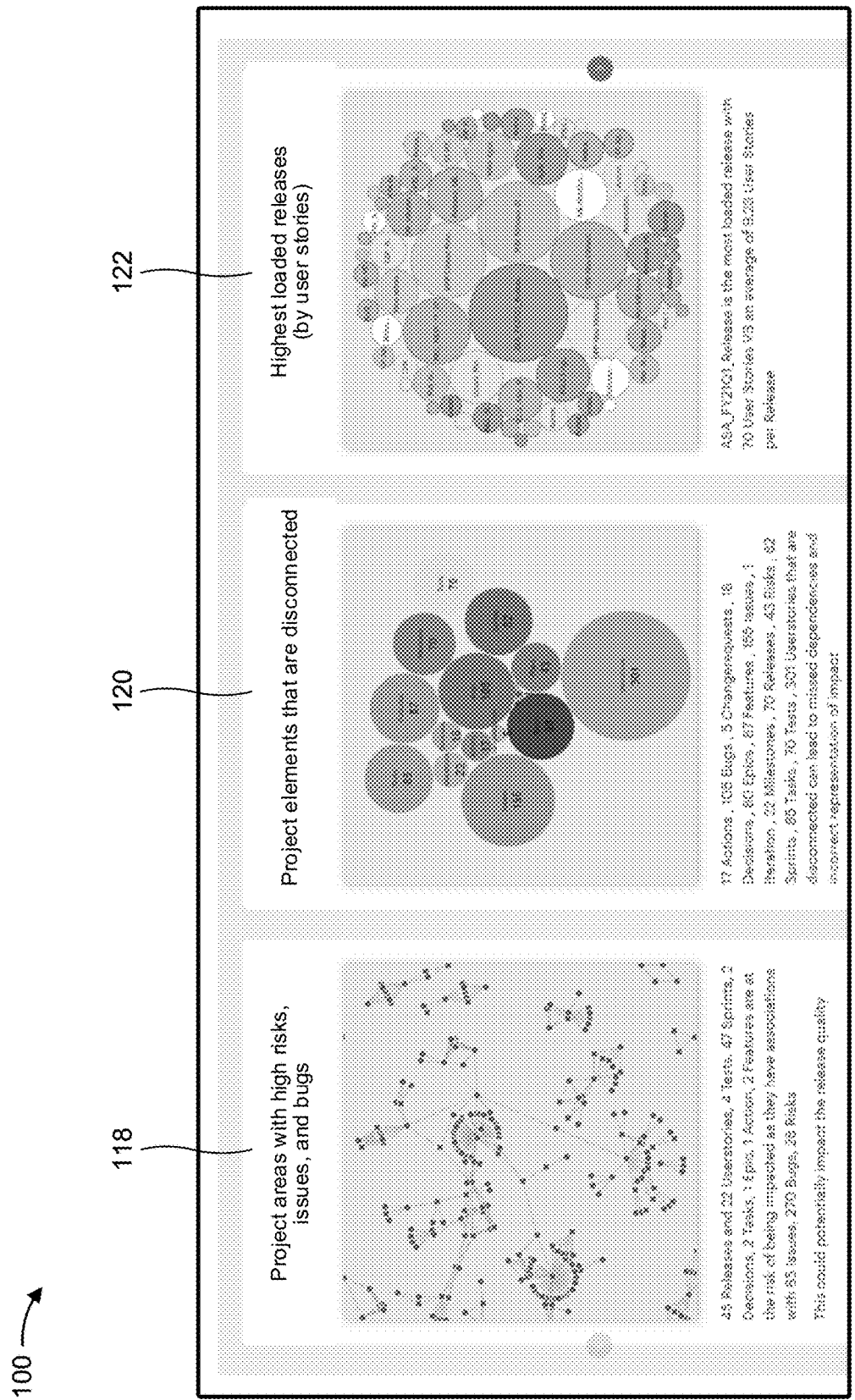

For example, referring to FIG. 1C, reference number 118 illustrates an example of a view that may be created and rendered by the project visualization system to represent areas within a project that have high risks, issues, and/or bugs. For example, the view illustrated by reference number 118 is a galaxy view graphically depicting various project elements that are associated with risks, issues, and/or bugs that could potentially impact release quality. In other examples, reference number 120 illustrates an example of a view that may be created and rendered by the project visualization system to graphically depict disconnected project elements, which could lead to missed dependencies and/or an incorrect representation of an impact, and reference number 122 illustrates an example of a view that may be created and rendered by the project visualization system to depict highly loaded releases (e.g., where each release is a node or bubble with a size that is based on a number of user stories contained in or otherwise associated with the release).

In some implementations, using the graph data structures described herein to represent project elements and associations among project elements may enable various algorithms to evaluate and conduct data analytics to provide insight into connected project elements. For example, in some implementations, the graph data structures can be used to create and render views that visually depict potential problem areas in a project (e.g., showing project elements associated with large numbers of risks, defects, issues, or impediments) and/or views that visually depict early warnings for project elements that may have dependencies on other project elements that are delayed or at risk, among other examples. Furthermore, the graph data structures representing the project elements and the associations among project elements may be independent of project type, whereby the project visualization system may support projects carried out using agile, waterfall, or other suitable methodologies, and the graph data structures may be used to depict dependencies between project elements regardless of a number of degrees of separation there may be between project elements. The graph data structures may be unconstrained by a hierarchy or a connection type between nodes (e.g., associations may be directional and/or bidirectional, among other examples), whereby a view created and rendered by the project visualization system may depict any number of connections in any direction. Furthermore, in some implementations, the views that are created and rendered by the project visualization system may enable interactive control over associations among project elements, where a user at the client device may interact with the view (e.g., in a browser) to provide inputs to add, remove, modify, or otherwise customize links or associations between project elements.

Referring again to FIG. 1A, as shown by reference number 124, the project visualization system may support a view recommendation workflow in which the recommendation engine receives a natural language description of a problem statement (e.g., a business problem, a resource planning problem, or another suitable problem to be solved or investigated based on project data). In some implementations, the recommendation engine may use an artificial intelligence model trained to extract an intent from the problem statement and to recommend one or more views that are relevant to the intent of the problem statement (e.g., the recommended views may depict project elements and/or associations in a visual format, such as a galaxy view format, a composition view format, an impact analysis view format, or another suitable view format that lends itself to resolving or providing insight into the problem statement). For example, in some implementations, the artificial intelligence model may include a knowledge-based recommendation model trained using historical data related to different view formats that are available through the project visualization system and problem statements that were associated with historical usage of the different view formats (e.g., the knowledge-based recommendation model may store mappings between problem statements, intents and/or project data, and corresponding views, which may be used to determine the recommended views).

Accordingly, in some implementations, an end user at the client device may define a problem statement in natural language terms to express what project data the end user desires to visualize and/or how the end user desires to visualize the project data, and the recommendation engine may use natural language processing to identify the intent of the problem statement and the project elements, associations, and/or view formats suited to the intent of the problem statement. For example, in some implementations, the natural language processing may generally use syntax and semantic analysis techniques to determine how different words in the natural language problem statement are contextually related to one another and/or may identify a grammatical structure of the natural language problem statement (e.g., using tokenization techniques) to organize the natural language problem statement into smaller semantic units (e.g., individual words, phrases, and/or punctuations, among other examples). In this way, the recommendation engine may determine the intent of the natural language problem statement, which may generally refer to what data the end user desires to obtain (e.g., visualize) and/or what problem the end user desires to solve (e.g., via a suitable view that visualizes project data).

As shown by reference number 126, the view recommendation workflow may further include indicating the recommended views to solve the problem statement to the client device. Accordingly, the end user at the client device may select one or more recommended views to be rendered, which may cause the recommendation engine to communicate with the view generation engine to initiate the backend processing workflow to pull, aggregate, obtain and/or otherwise process the project data needed to support the requested view, as shown by reference number 128. Furthermore, as shown by reference number 130, the end user selecting the recommended view(s) to be rendered may cause the recommendation engine to communicate with the UI layer to initiate the frontend processing workflow in order to create and render the selected view(s) based on the project data that is obtained in the backend processing workflow. Furthermore, user inputs to select a recommended view or choose a different view may be used as feedback to the recommendation engine to enable continuous learning by the artificial intelligence model, which may result in more accurate view recommendations over time.

In some implementations, in addition to using artificial intelligence models and/or algorithms to recommend one or more views to the client device, the project visualization system may leverage artificial intelligence models and/or algorithms to recommend potential linkages between project elements. In general, the project visualization system may use machine learning algorithms such as natural language processing to inspect project data stored in the data fabric that relates to various project elements and/or attributes associated with the project elements and predict associations between project elements. For example, when a change request is created in a project management system, which may be detected when the backend processing workflow pulls delta project management data that includes data related to the change request, the artificial intelligence models and/or algorithms may be used to predict other project elements (e.g., user stories) that may be impacted by the change request. Accordingly, the project visualization system may render, at the client device via the UI layer, an interface that provides the end user with an option to accept or reject the recommended linkages, and the recommended or predicted linkages may also be stored in the data fabric. In some implementations, the project visualization system may use data indicating whether the user accepted or rejected the recommended linkages to further train the machine learning algorithms for better accuracy over time. For example, depending on whether the end user accepts, rejects, or modifies a recommended association between project elements, the project visualization system may modify appropriate data prediction output labels and save the modified output labels back to the data fabric. Accordingly, the artificial intelligence models used in the project visualization system may utilize the modified output labels for retraining to increase accuracy.

Figure 1D:
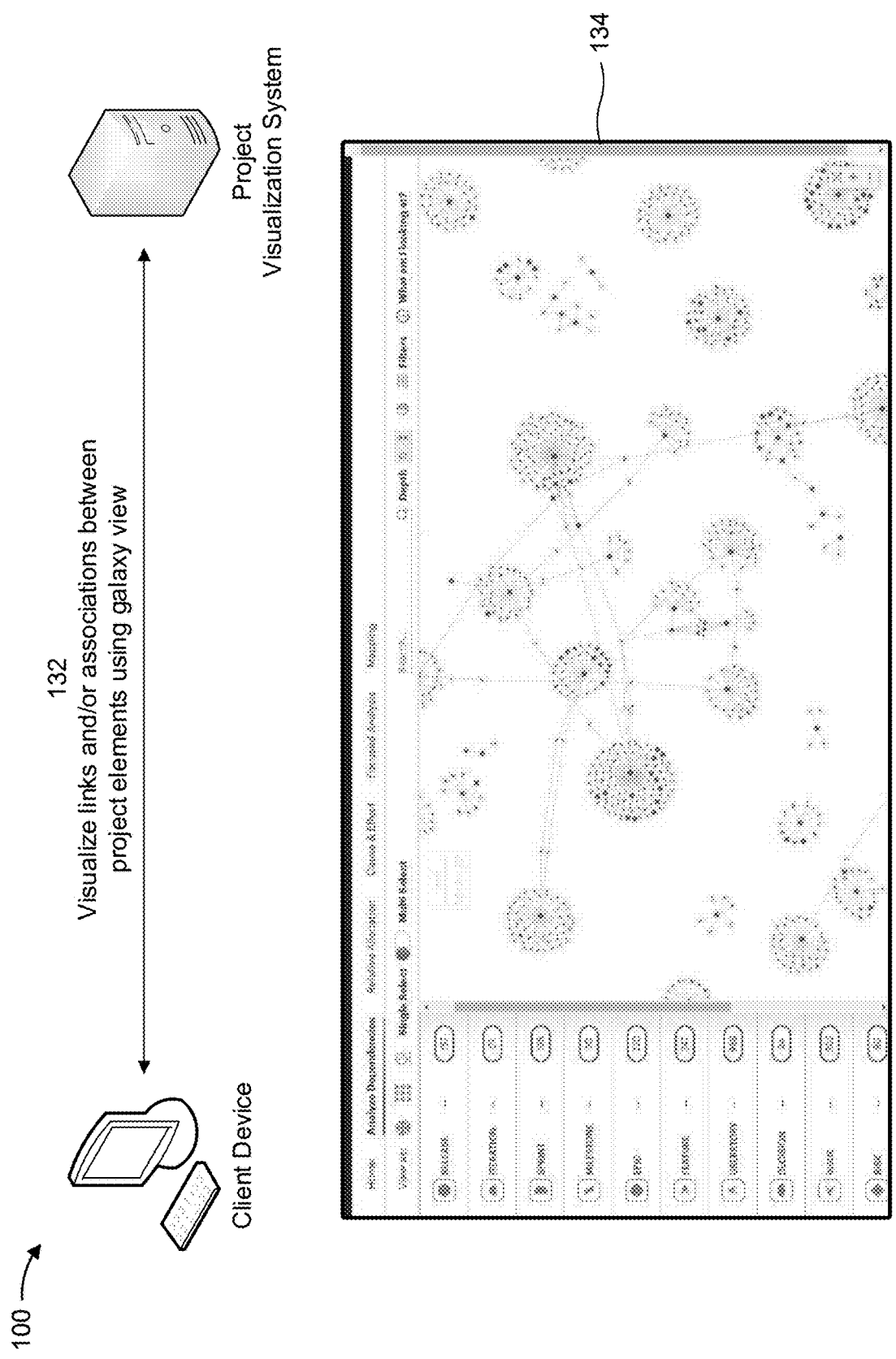

In some implementations, as described herein, the various workflows supported in the project visualization system may support various functional use cases and/or data analytics use cases. For example, as shown in FIG. 1D, and by reference number 132, the client device may interact with the project visualization system to create and render a galaxy view to visualize links and/or associations between project elements. For example, in FIG. 1D, reference number 134 illustrates an example galaxy view that depicts associations between project elements at different levels, where nodes corresponding to closely related project elements may be clustered together in galaxy-like structures to illustrate an intensity of connections between project elements. In this way, the end user may interact with (e.g., click on) a node that corresponds to a project element to view more details related to the attributes of the project element and/or the other project elements that are associated with the project element. Furthermore, in some implementations, the end user may continue to select different nodes that correspond to different project elements to form a traversal chain and view other project elements impacting the chain.

In one example, the galaxy view supported by the project visualization system may enable a functional use case that provides an ability to discover and prioritize deliverables with a high impact. For example, an end user at the client device may be following up on a decision that was discussed at a meeting, and the end user may have a limited view and disparate data points to discover impact areas and/or deliverables linked to the decision. Accordingly, the end user may access the project visualization system via the client device, and may indicate the decision to be explored in an interface associated with the galaxy view. Additionally, or alternatively, the end user may provide a natural language problem description related to the decision to the recommendation engine, which may recommend the galaxy view based on the intent of the natural language problem description. In either case, the project visualization system may create and render the galaxy view to represent the project elements impacted by the decision, and the end user may interact with the galaxy view to find that the impacted project elements are associated with various other project elements. Accordingly, the end user may use the galaxy view to make an actionable decision, such as prioritizing closure of the project elements (e.g., deliverables) impacted by the decision to minimize the impact.

Figure 1E:
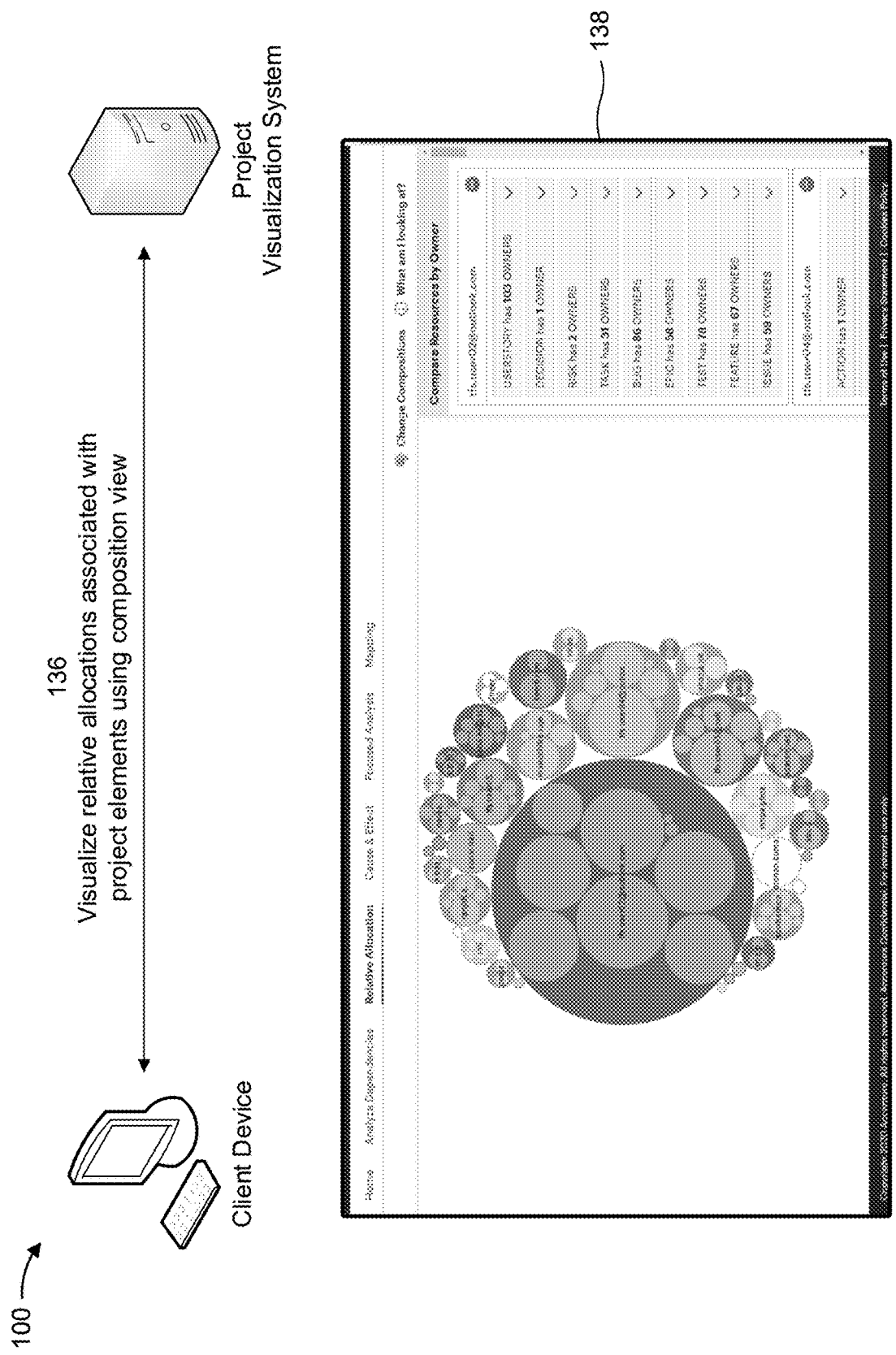

In another example, as shown in FIG. 1E, and by reference number 136, the client device may interact with the project visualization system to create and render a composition view to visualize relative allocations associated with one or more project elements. For example, in FIG. 1E, reference number 138 illustrates an example composition view that depicts resources (e.g., owners) assigned to different project elements, where nodes in the composition view correspond to project elements and sub-nodes correspond to resources assigned to the project elements. For example, the graph data structures used to represent the project elements and the associations among project elements may be used to evaluate a composition of project elements, including whether composed project elements are directly connected by one degree of separation or indirectly connected via multiple degrees of separation. In this way, the end user at the client device may compare project elements based on composition (e.g., the end user may compare releases based on composed user stories, compare resources based on assigned project elements, and/or compare and balance release life cycles across multiple releases, among other examples).

In one example, the composition view supported by the project visualization system may enable a functional use case that provides an ability to view resource loading in a project. For example, an end user at the client device may be working on a staffing plan for a project, and the end user may not have a definite approach to assess how team members are loaded across different metrics. Accordingly, the end user may access the project visualization system and open an interface associated with the composition view, or the end user may provide a natural language problem description related to the staffing problem to the recommendation engine, which may recommend the composition view based on the composition view historically being used to solve staffing problems or solve problems related to resource loading. In either case, the project visualization system may create and render the composition view to represent groups by resources and sizes using one or more criteria (e.g., owner and/or approver) that provide detailed information related to work that each team member is handling. In this way, the end user may obtain an informative view of the team workload to decide on a staffing plan that achieves a balanced work distribution among team members working on the project.

Figure 1F:
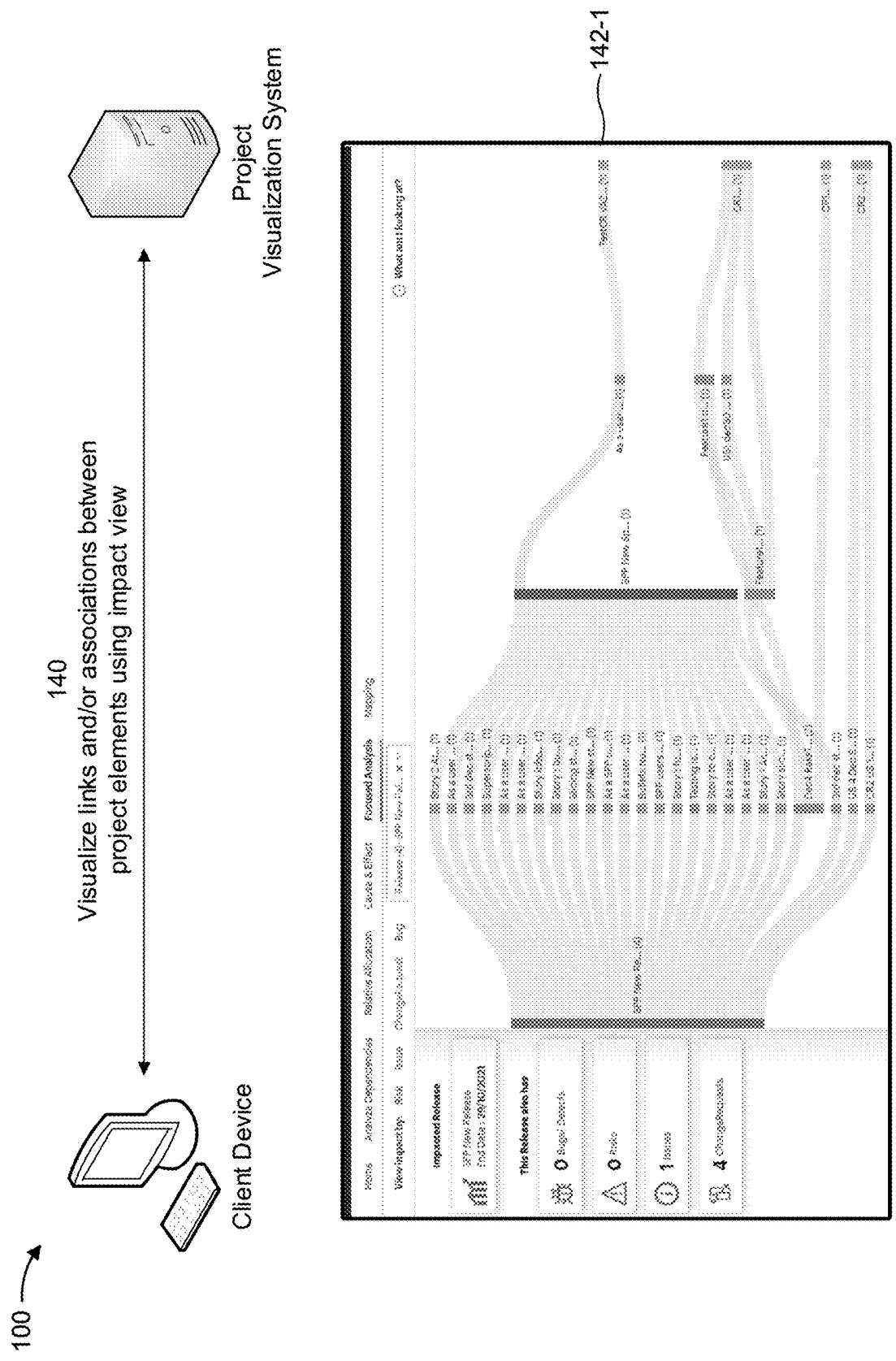

In another example, as shown in FIG. 1F, and by reference number 140, the client device may interact with the project visualization system to create and render an impact view to visualize links and/or associations between project elements. For example, in some implementations, the impact view may be generated by traversing the graph data structures, starting from a selected root node corresponding to a source project element, to one or more leaf nodes in the graph, which may be used to generate an impact view that can highlight the impact or dependency of the leaf nodes relative to the root note. For example, if the root node corresponds to a release and the leaf nodes represent risks, the graph traversal techniques described herein may highlight the impact of all risks that are impacting the release, irrespective of how many degrees of separation are between the risk(s) and the release. For example, in some implementations, the impact view may be generated using an algorithm that crawls through a web of associations defined in the graph data structures to find all the paths that start from a root node and reach out to a target entity that has an impact on the selected root node. In this way, the end user can clearly visualize the main project elements in the path of the selected root node and assess the impact on the selected root node. For impacting project elements such as risks, the impact view may also show the associated business cost in a rolled up manner.

Figure 1G:
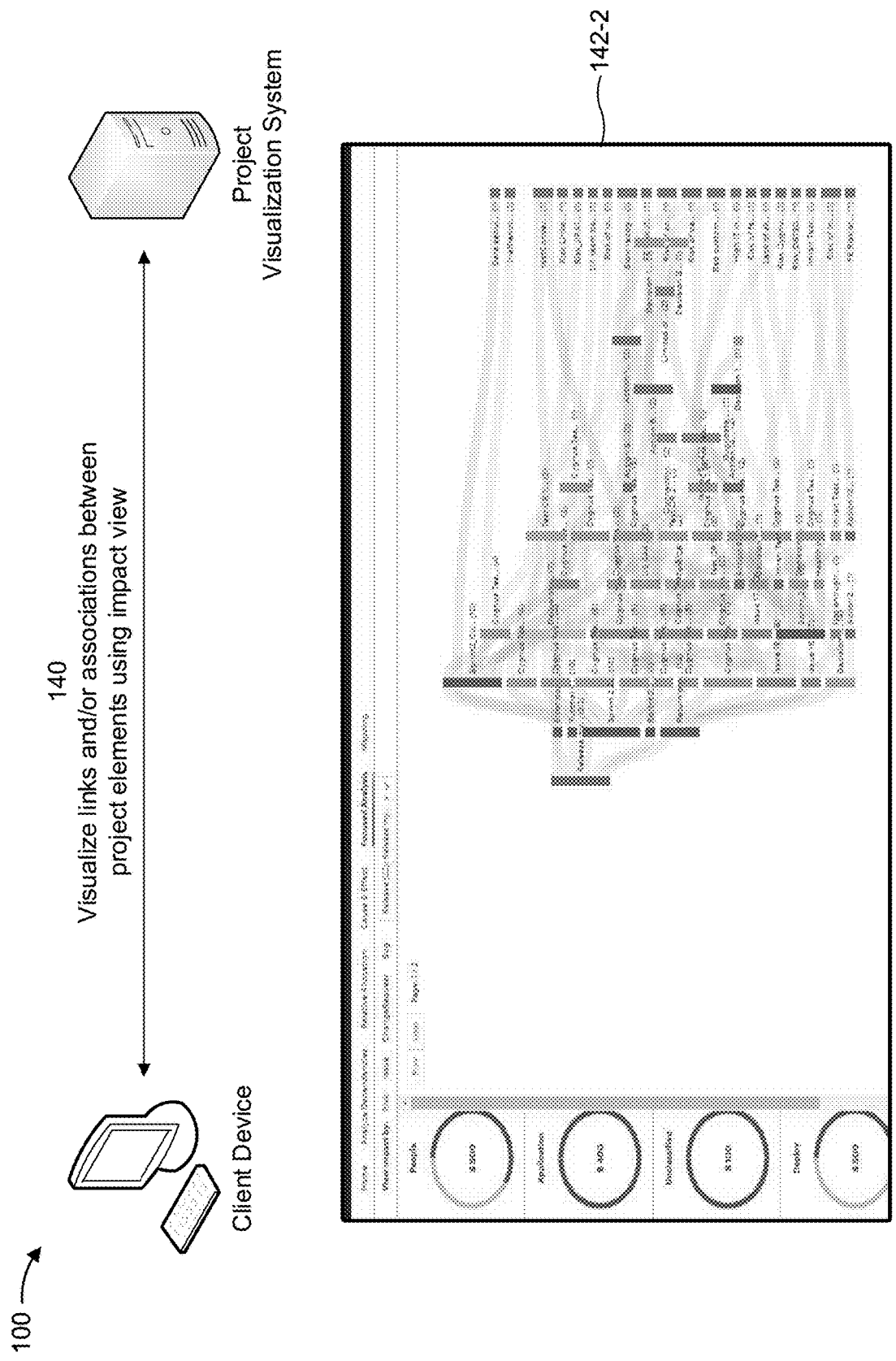

For example, in some implementations, the algorithm used to generate the impact view may create a Sankey view (or Sankey diagram), which is a type of flow diagram used to emphasize major transfers or flows within a system. For example, in FIG. 1F, reference number 142-1 illustrates an example of an impact view that represents various downstream project elements impacting a release at varying degrees of separations, with bands connecting different nodes to represent the associations between project elements. In the example illustrated in FIG. 1F, the size of each node may be proportional to a number of upstream and/or downstream project elements that are associated with the respective node. Referring to FIG. 1G, reference number 142-2 illustrates another example impact view that represents a path between a root node and various leaf nodes to depict various paths that are impacting the root node. For example, as described herein, the associations and links among project elements may be discovered from the project management data pulled from the data fabric, which may result in creation of graph data structures including a large web of links. In order to generate the impact view, the project visualization system may receive information indicating a source (root) node and one or more target nodes for which path tracing is requested. Accordingly, starting from the root node, the project visualization system may recursively expand the source node for associations, inspect the nodes in the recursive collection for target nodes to be included in the impact view, verify that the recursive expansion does not cross a boundary through sibling nodes, and then prune the collected associations to avoid included single-ended nodes (e.g., thereby preserving the shortest path among multiple parallel paths with different lengths).

In one example, the impact view supported by the project visualization system may enable a functional use case that provides an ability to identify risks, issues, bugs, change requests, and/or other project elements impacting one or more releases. For example, an end user at the client device may desire to monitor the progress of an upcoming set of releases, but the end user may not have a detailed and/or consolidated view of each release and the risk, issues, and/or bugs impacting the releases. Accordingly, the end user may access the project visualization system and open an interface associated with the impact view, or the end user may provide a natural language problem description related to the desire to monitor the progress of upcoming release to the recommendation engine, which may recommend the impact view to provide a holistic view of the project elements impacting the releases. In either case, the project visualization system may use the algorithm described above to obtain project management data from all relevant data sources to generate an impact analysis view starting from a root node that corresponds to a release to be monitored. In this way, the impact view may show all direct and/or indirect risks, issues, bugs, change requests, and/or other project elements impacting the release along with other relevant information (e.g., a mitigation cost) such that the end user can take proactive steps to avert or mitigate project elements that may block the release.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
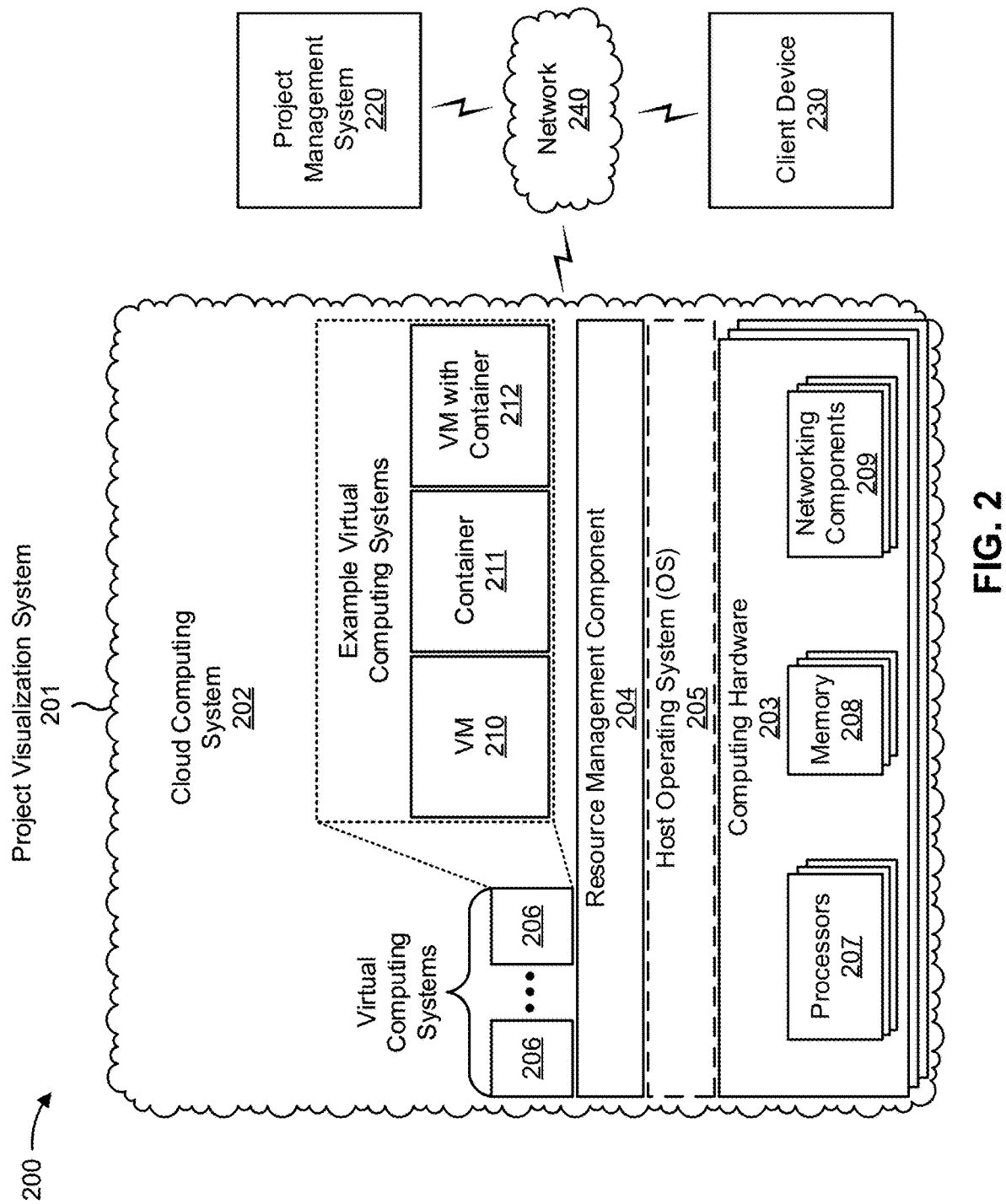
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a project visualization system 201, which may include one or more elements of and/or may execute within a cloud computing system 202. The cloud computing system 202 may include one or more elements 203-212, as described in more detail below. As further shown in FIG. 2, environment 200 may include a project management system 220, a client device 230, and a network 240. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the project visualization system 201 may include one or more elements 203-212 of the cloud computing system 202, may execute within the cloud computing system 202, and/or may be hosted within the cloud computing system 202, in some implementations, the project visualization system 201 may not be cloud-based (e.g., may be implemented outside of a cloud computing system) or may be partially cloud-based. For example, the project visualization system 201 may include one or more devices that are not part of the cloud computing system 202, such as device 300 of FIG. 3, which may include a standalone server or another type of computing device. The project visualization system 201 may perform one or more operations and/or processes described in more detail elsewhere herein.

The project management system 220 includes one or more devices capable of receiving, generating, storing, processing, providing, and/or routing information associated with project elements, associations, links, dependencies, and/or other suitable information associated with a project, as described elsewhere herein. The project management system 220 may include a communication device and/or a computing device. For example, the project management system 220 may include a data structure, a database, a data source, a server, a database server, an application server, a client server, a web server, a host server, a proxy server, a virtual server (e.g., executing on computing hardware), a server in a cloud computing system, a device that includes computing hardware used in a cloud computing environment, or a similar type of device. As an example, the project management system 220 may store information associated with project elements, associations, links, dependencies, and/or other suitable information associated with a project, which may be used by the project visualization system 201 to generate one or more data structures that represent project elements and/or associations among project elements such that the project visualization system 201 can render one or more views to visualize project data using the one or more data structures, as described in more detail elsewhere herein.

The project management system 220 may communicate with one or more other devices of environment 200, as described elsewhere herein.

The client device 230 includes one or more devices capable of receiving, generating, storing, processing, and/or providing information associated with visualizing project management data, as described elsewhere herein. The client device 230 may include a communication device and/or a computing device. For example, the client device 230 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device. The client device 230 may communicate with one or more other devices of environment 200, as described elsewhere herein.

The network 240 includes one or more wired and/or wireless networks. For example, the network 240 may include a cellular network, a public land mobile network (PLMN), a local area network (LAN), a wide area network (WAN), a private network, the Internet, and/or a combination of these or other types of networks. The network 240 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
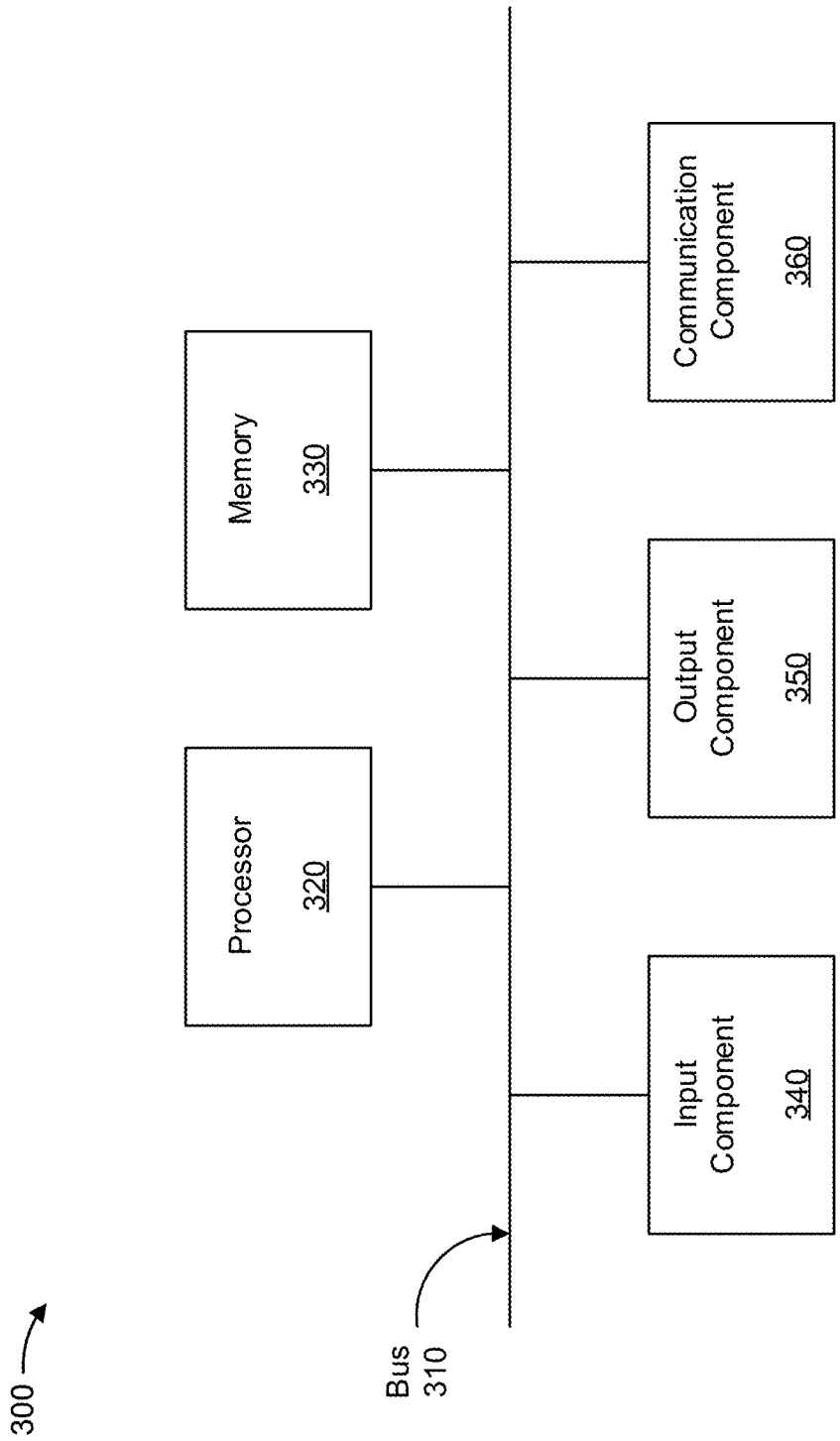
FIG. 3 is a diagram of example components of one or more devices of FIG. 2.

FIG. 3 is a diagram of example components of a device 300, which may correspond to the project visualization system 201, the project management system 220, and/or the client device 230 shown in FIG. 2. In some implementations, the project visualization system 201, the project management system 220, and/or the client device 230 include one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein. Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
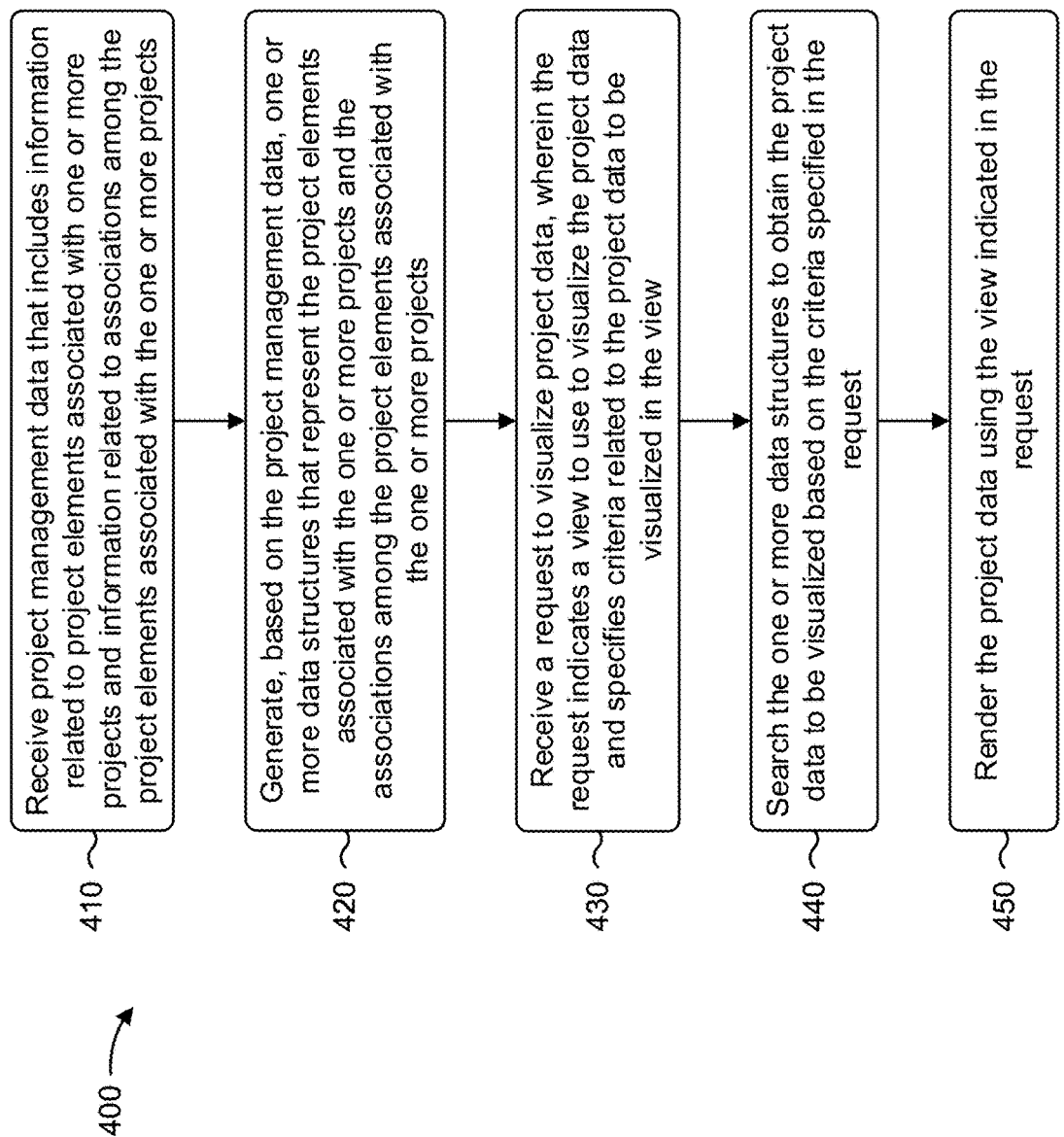
FIG. 4 is a flowchart of an example process relating to intelligent dependency management.

FIG. 4 is a flowchart of an example process 400 associated with a project visualization system. In some implementations, one or more process blocks of FIG. 4 are performed by a project visualization system (e.g., project visualization system 201). In some implementations, one or more process blocks of FIG. 4 are performed by another device or a group of devices separate from or including the project visualization system, such as a project management system (e.g., project management system 220) and/or a client device (e.g., client device 230). Additionally, or alternatively, one or more process blocks of FIG. 4 may be performed by one or more components of device 300, such as processor 320, memory 330, input component 340, output component 350, and/or communication component 360.

As shown in FIG. 4, process 400 may include receiving project management data that includes information related to project elements associated with one or more projects and information related to associations among the project elements associated with the one or more projects (block 410). For example, the project visualization system may receive project management data that includes information related to project elements associated with one or more projects and information related to associations among the project elements associated with the one or more projects, as described above.

As further shown in FIG. 4, process 400 may include generating, based on the project management data, one or more data structures that represent the project elements associated with the one or more projects and the associations among the project elements associated with the one or more projects (block 420). For example, the project visualization system may generate, based on the project management data, one or more data structures that represent the project elements associated with the one or more projects and the associations among the project elements associated with the one or more projects, as described above.

As further shown in FIG. 4, process 400 may include receiving a request to visualize project data, wherein the request indicates a view to use to visualize the project data and specifies criteria related to the project data to be visualized in the view (block 430). For example, the project visualization system may receive a request to visualize project data, wherein the request indicates a view to use to visualize the project data and specifies criteria related to the project data to be visualized in the view, as described above. In some implementations, the request indicates a view to use to visualize the project data and specifies criteria related to the project data to be visualized in the view.

As further shown in FIG. 4, process 400 may include searching the one or more data structures to obtain the project data to be visualized based on the criteria specified in the request (block 440). For example, the project visualization system may search the one or more data structures to obtain the project data to be visualized based on the criteria specified in the request, as described above.

As further shown in FIG. 4, process 400 may include rendering the project data using the view indicated in the request (block 450). For example, the project visualization system may render the project data using the view indicated in the request, as described above.

Process 400 may include additional implementations, such as any single implementation or any combination of implementations described below and/or in connection with one or more other processes described elsewhere herein.

In a first implementation, the one or more data structures include one or more graphs in which each node represents a project element and in which each edge or connection represents an association between two project elements.

In a second implementation, alone or in combination with the first implementation, the one or more data structures are searched using a recursive depth-first search technique.

In a third implementation, alone or in combination with one or more of the first and second implementations, the information included in the project management data includes only delta data since a most recent iteration in which the project management data was pulled from a data fabric that stores the project management data.

In a fourth implementation, alone or in combination with one or more of the first through third implementations, process 400 includes receiving, from a client device, a natural language description related to a problem statement associated with the project data to be visualized in the view; identifying, using an artificial intelligence model, one or more recommended views to visualize the project data based on an intent associated with the problem statement and one or more project elements or associations relevant to the intent; and providing, to the client device, information indicating the one or more recommended views.

In a fifth implementation, alone or in combination with one or more of the first through fourth implementations, one or more of a first workflow to generate the one or more data structures or a second workflow to render the view are initiated based on an input from the client device selecting the view from the one or more recommended views.

In a sixth implementation, alone or in combination with one or more of the first through fifth implementations, the view indicates potential problem areas associated with the project data that is rendered in the view or warnings based on the project data rendered in the view having dependencies on other project elements that are associated with one or more potential problem areas.

In a seventh implementation, alone or in combination with one or more of the first through sixth implementations, the view indicates a composition including direct connections or indirect connections associated with project elements included in the project data that is rendered in the view.

In an eighth implementation, alone or in combination with one or more of the first through seventh implementations, the view indicates a strength of coupling between types of project elements included in the project data that is rendered in the view.

In a ninth implementation, alone or in combination with one or more of the first through eighth implementations, the view indicates one or more target project elements have an impact on a source project element.

Although FIG. 4 shows example blocks of process 400, in some implementations, process 400 includes additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
   receiving, by a device, project management data that includes information related to project elements associated with one or more projects and information related to associations among the project elements associated with the one or more projects;
   determining, by the device and based on the project management data, the associations among the project elements associated with the one or more projects;
   utilizing, by the device, an artificial intelligence model to inspect the project management data to predict one or more potential associations among the project elements associated with the one or more projects,
      wherein the one or more potential associations among the project elements include an association of a first project element with a second project element,
      wherein the first project element is associated with a first phase of a project of the one or more projects and a first delivery type methodology and the second project element is associated with a second phase of the project and a second delivery type methodology, and
      wherein the first phase is different than the second phase and the first delivery type methodology is different than the second delivery type methodology;
   generating, by the device and based on the associations among the project elements associated with the one or more projects, one or more data structures that represent the project elements associated with the one or more projects and the associations among the project elements associated with the one or more projects;
   receiving, by the device, a request to visualize project data,
      wherein the request indicates a view to use to visualize the project data and specifies criteria related to the project data to be visualized in the view;

searching, by the device, the one or more data structures to obtain the project data to be visualized based on the criteria specified in the request; and rendering, by the device, the project data and information indicating the one or more potential associations using the view indicated in the request.

2. The method of claim 1, wherein the one or more data structures include one or more graphs in which each node represents a project element and in which each edge or connection represents an association between two project elements.

3. The method of claim 1, wherein the one or more data structures are searched using a recursive depth-first search technique.

4. The method of claim 1, wherein the information included in the project management data includes only delta data since a most recent iteration in which the project management data was pulled from a data fabric that stores the project management data.

5. The method of claim 1, further comprising:
receiving, from a client device, a natural language description related to a problem statement associated with the project data to be visualized in the view;
identifying, using the artificial intelligence model, one or more recommended views to visualize the project data based on an intent associated with the problem statement and one or more project elements or associations relevant to the intent; and
providing, to the client device, information indicating the one or more recommended views.

6. The method of claim 5, wherein one or more of a first workflow to generate the one or more data structures or a second workflow to render the view are initiated based on an input from the client device selecting the view from the one or more recommended views.

7. The method of claim 1, wherein the view indicates potential problem areas associated with the project data that is rendered in the view or warnings based on the project data rendered in the view having dependencies on other project elements that are associated with one or more potential problem areas.

8. The method of claim 1, wherein the view indicates a composition including direct connections or indirect connections associated with project elements included in the project data that is rendered in the view.

9. The method of claim 1, wherein the view indicates a strength of coupling between types of project elements included in the project data that is rendered in the view.

10. The method of claim 1, wherein the view indicates one or more target project elements have an impact on a source project element.

11. A device, comprising:
one or more memories; and
one or more processors, coupled to the one or more memories, configured to:
receive project data that includes information related to project elements associated with one or more projects and information related to associations among the project elements associated with the one or more projects;
determine, based on the project data, the associations among the project elements associated with the one or more projects;
utilize an artificial intelligence model to inspect the project data to predict one or more potential associations among the project elements associated with the one or more projects,
wherein the one or more potential associations among the project elements include an association of a first project element with a second project element,
wherein the first project element is associated with a first phase of a project of the one or more projects and a first delivery type methodology and the second project element is associated with a second phase of the project and a second delivery type methodology, and
wherein the first phase is different than the second phase and the first delivery type methodology is different than the second delivery type methodology;
generate, based on the associations among the project elements associated with the one or more projects, one or more data structures that represent the project elements associated with the one or more projects and the associations among the project elements associated with the one or more projects;
receive, from a client device, a natural language description related to a problem statement associated with project data to be visualized;
identify, using the artificial intelligence model, one or more recommended views to visualize the project data based on an intent associated with the problem statement and one or more project elements or associations relevant to the intent;
provide, to the client device, information indicating the one or more recommended views and information associated with the one or more potential associations among the project elements associated with the one or more projects; and
initiate one or more workflows to render the project data using a view that is selected from the one or more recommended views.

12. The device of claim 11, wherein the one or more data structures include one or more graphs in which each node represents a project element and in which each edge or connection represents an association between two project elements.

13. The device of claim 11, wherein the one or more workflows include a first workflow to generate the one or more data structures for the view that is selected from the one or more recommended views and a second workflow to render the one or more data structures on a user interface according to the view that is selected from the one or more recommended views.

14. The device of claim 11, wherein the view indicates potential problem areas associated with the project data that is rendered in the view or warnings based on the project data rendered in the view having dependencies on other project elements that are associated with one or more potential problem areas.

15. The device of claim 11, wherein the view indicates a composition including direct connections or indirect connections associated with project elements included in the project data that is rendered in the view.

16. The device of claim 11, wherein the view indicates a strength of coupling between types of project elements included in the project data that is rendered in the view.

17. The device of claim 11, wherein the view indicates one or more target project elements have an impact on a source project element.

18. A non-transitory computer-readable medium storing a set of instructions, the set of instructions comprising:

one or more instructions that, when executed by one or more processors of a device, cause the device to:
  receive project management data that includes information related to project elements associated with one or more projects and information related to associations among the project elements associated with the one or more projects;
  determine, based on the project management data, the associations among the project elements associated with the one or more projects;
  utilize an artificial intelligence model to inspect the project management data to predict one or more potential associations among the project elements associated with the one or more projects,
    wherein the one or more potential associations among the project elements include an association of a first project element with a second project element,
    wherein the first project element is associated with a first phase of a project of the one or more projects and a first delivery type methodology and the second project element is associated with a second phase of the project and a second delivery type methodology, and
    wherein the first phase is different than the second phase and the first delivery type methodology is different than the second delivery type methodology;
  generate, based on the project management data, one or more data structures that represent the project elements associated with the one or more projects and the associations among the project elements associated with the one or more projects,
    wherein the one or more data structures include one or more graphs in which each node represents a project element and in which each edge or connection represents an association between two project elements;
  receive a request to visualize project data,
    wherein the request indicates a view to use to visualize the project data and specifies criteria related to the project data to be visualized in the view;
  search the one or more data structures to obtain the project data to be visualized based on the criteria specified in the request; and
  render the project data and information indicating the one or more potential associations using the view indicated in the request.

19. The non-transitory computer-readable medium of claim 18, wherein the one or more instructions further cause the device to:
  receive, from a client device, a natural language description related to a problem statement associated with the project data to be visualized in the view;
  identify, using the artificial intelligence model, one or more recommended views to visualize the project data based on an intent associated with the problem statement and one or more project elements or associations relevant to the intent; and
  provide, to the client device, information indicating the one or more recommended views.

20. The non-transitory computer-readable medium of claim 19, wherein one or more of a first workflow to generate the one or more data structures or a second workflow to render the view are initiated based on an input from the client device selecting the view from the one or more recommended views.

* * * * *